United States Patent [19]

Addy et al.

[11] Patent Number: 4,848,887
[45] Date of Patent: Jul. 18, 1989

[54] FIXED FOCUS BINOCULARS

[75] Inventors: Donald E. Addy; Byron M. Saper, both of Kansas City, Mo.

[73] Assignee: Jason Empire, Inc., Overland Park, Kans.

[21] Appl. No.: 116,625

[22] Filed: Nov. 3, 1987

[51] Int. Cl.$^4$ .................... G02B 7/06; G02B 23/00
[52] U.S. Cl. .................... 350/550; 350/545; 350/551
[58] Field of Search ............... 350/545, 546, 550, 552, 350/555, 551

[56] References Cited

U.S. PATENT DOCUMENTS

| | | | |
|---|---|---|---|
| 2,002,782 | 5/1935 | Lester | 350/546 |
| 2,436,574 | 2/1948 | Johanson | 350/555 |
| 3,540,792 | 11/1970 | Akin, Jr. | 350/552 |
| 3,744,872 | 7/1973 | Akin, Jr. et al. | 350/552 |
| 3,985,421 | 10/1976 | Beecher | 350/552 |
| 4,080,042 | 3/1978 | Hornschu et al. | 350/546 |
| 4,325,602 | 4/1982 | Lange | 350/545 |
| 4,329,013 | 5/1982 | Hengst | 350/550 |
| 4,346,960 | 8/1982 | Lehrmund et al. | 350/552 |

Primary Examiner—Bruce Y. Arnold
Assistant Examiner—Martin Lerner
Attorney, Agent, or Firm—Litman McMahon & Brown

[57] ABSTRACT

Binoculars include a pair of housings pivotally hinged therebetween with each housing having an objective lens and an eyepiece lens for cooperating to magnify an image seen therethrough. Each objective lens and respective eyepiece lens are fixed in position relative to one another and are positioned at such a distance from one another such that the focus through the combined lenses is fixed at infinity.

4 Claims, 2 Drawing Sheets

FIXED FOCUS BINOCULARS

BACKGROUND OF THE DISCLOSURE

The present invention relates to binoculars and in particular to binoculars having a focus that is fixed at infinity.

Conventional binoculars are constructed so as to allow a variation in distance between the eyepiece lens and associated objective lens of each lens set so that the focus of each lens set can be modified in accordance with the distance of a user from the object being viewed. Normally there is a mechanism for simultaneously adjusting the focus of each lens set. The structure required to allow this adjustability of the focus is usually expensive and adds substantially to the cost of the binoculars. For binoculars used by many different people, this also results in constant readjustment of the focus.

Both medical doctors and scientists recognize that eyes have a natural ability to make some adjustment to distance when focus is provided for an infinite distance. A normal healthy person whose eyes have not been damaged by age or disease can adjust approximately four diopters. It has been further determined that the range of ability to adjust, when focusing at an infinite distance, has nothing to do with the objective aperture of each set of lenses of the binoculars but rather is determined by the magnification developed by each set of lenses. In particular, the minimum distance to which a normal person can adjust is directly proportional to the square of the magnification divided by the diopter adjustment that a particular person can make. Therefore, where the magnification is 7 and a person can adjust four diopters, such a person can actually adjust an image focused at infinity such that they can view an image at 12.25 meters with apparent focus. As the magnification increases the ability of the eye to adjust to an image at infinite focus increases to larger distances. For example, at a magnification of 10 the minimum adjustable distance is approximately 25 meters.

Since most viewers of binoculars are utilizing low magnification and tend to view objects mostly at distances greater than this minimum adjustable distance, applicant has determined that the lens sets can be fixed and positioned to provide an infinite focus and yet allow a substantial variation in viewing due to the natural adjustability of the eye. Such a fixed focus allows a substantial savings in the cost of production of such binoculars and eliminates the need to constantly readjust the binoculars, especially when used by multiple viewers.

OBJECTS OF THE INVENTION

Therefore the objects of the present invention are: to provide binoculars having lens sets including objective and eyepiece lenses which are fixed in position relative to one another; to provide such lens sets that are fixed in position to provide focus at infinity; to provide such binoculars that are relatively easy and inexpensive to manufacture and which are especially well adapted for the intended purpose thereof.

Other objects and advantages of this invention will become apparent from the following description taken in conjunction with the accompanying drawings wherein are set forth, by way of illlustration and example, certain embodiments of this invention.

The drawings constitute a part of this specification and include exemplary embodiments of the present invention and illustrate various objects and features thereof.

DETAILED DESCRIPTION OF THE ILLUSTRATED EMBODIMENT

Figure 1:
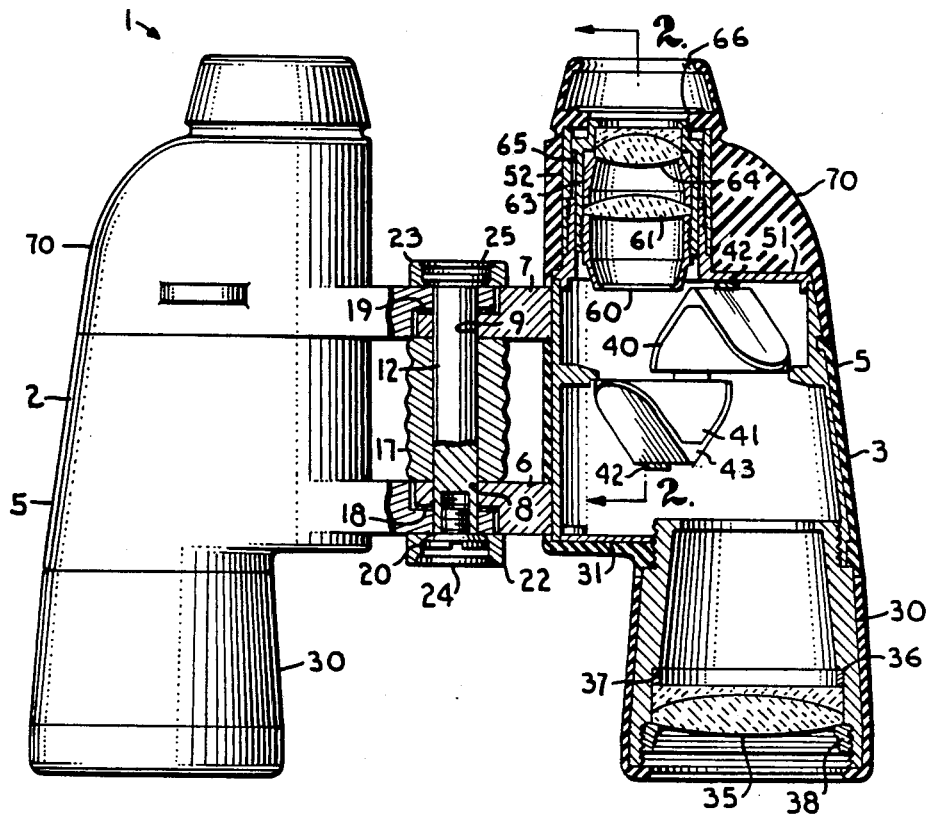
FIG. 1 is a top plan view of binoculars, in accordance with the present invention, with portions thereof broken away to show detail thereof.
Figure 2:
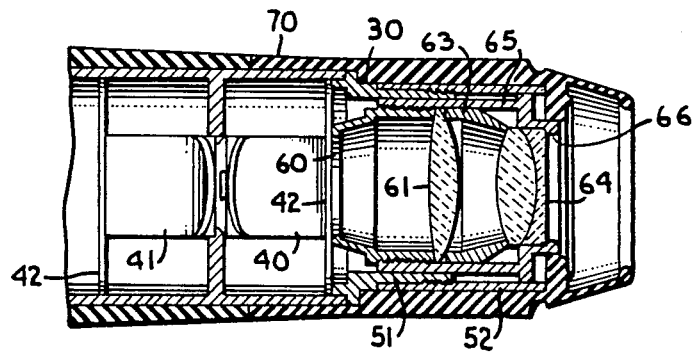
FIG. 2 is an enlarged and fragmentary cross-sectional view of the binoculars, taken along line 2—2 of FIG. 1.
Figure 3:
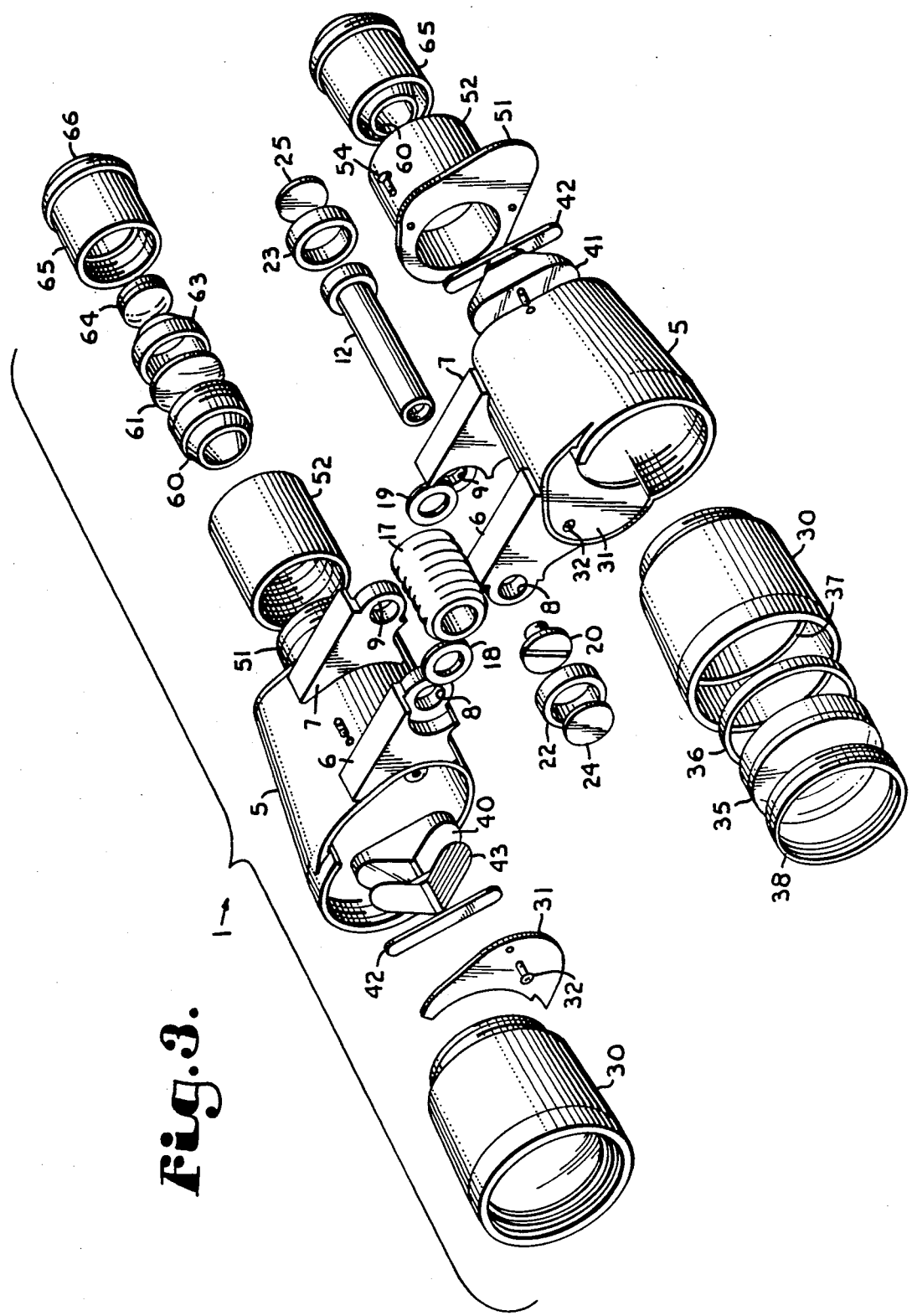
FIG. 3 is a perspective and exploded view of the binoculars with certain parts deleted for clarity.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents binoculars (binocular) comprising a pair of pivotally connected sections 2 and 3.

Each of the sections 2 and 3 include a body housing 5 having connection mountings 6 and 7 projecting from the sides thereof. Each of the pivotal mountings 6 and 7 include coaxially aligned apertures 8 and 9 respectively. The apertures are sized to receive a center axle 12 therethrough and are sufficiently spaced to allow a larger diameter surrounding member 17 to be positioned around the axle 12 and between the mountings 6 and 7. Washers 18 and 19 are provided for positioning between the interconnected pairs of mountings 6 and 7. A body tension screw 20 secures the axle 12 in the apertures 8 and 9 when the apertures 8 and 9 of both of the sections 2 and 3 are colinearly aligned and the screw 20 may be adjusted by the user to provide little friction to allow easy swinging movement of the body housings 5 relative to one another about the axle 12 or to provide a substantial amount of friction as desired by the particular user. Normally, if only one user is utilizing the binoculars 1, the tension on the screw 20 is set fairly high, as frequent adjustment is not necessary. Bottom cap 22 and top cap 23 cover opposite ends of the axle 12 and in turn receive cover plates 24 and 25 respectively.

Threadably mounted in one end of each body housing 5 is an objective barrel 30. An additional opening near the same end of each housing 5 which is not covered by the objective barrel 30 is covered by a bottom cover plate 31 held in position by a fastener 32. Mounted in the end of each objective barrel 30 opposite the body housing 5 is an objective lens 35. The objective lens 35 is a conventional convex/concave lens utilized in binoculars of this type. The objective lens 35 is mounted on a washer 36 which in turn is seated on a lip 37 within the objective barrel 30. An objective lens retainer 30 threadably mounts within the end of the barrel 30 and holds the objective lens 35 in fixed position relative to the objective barrel 30, when assembled.

Mounted within each body housing 5 is a pair of prisms 40 and 41. The prisms 40 and 41 are mounted on prism clamp bars 42 and have associated therewith prism shades 43. The function of the prisms 40 and 41 is to erect the image without use of additional lenses, reduce the length of the binoculars 1 by reflecting light back and forth along the same barrel and allow the objective lenses 35 to be spaced further apart than the eyes of the user so as to increase the stereo effect of the user's view. The prisms 40 and 41 are aligned to sequentially receive light from the objective lens 35 first onto the prism 40 after which it is transferred to the prism 41 and thereafter leaves the prism 41 parallel to the incidence of the light passing through the objective lens 35, but no longer colinearly therewith. Attached to each of the body housings 5 opposite a respective objective barrel 30 is an upper cover 51 having threadably attached thereto an ocular sleeve 52. Each upper cover 51 is secured to the end of the respective body housing 5 by appropriate fasteners 54.

Threadably mounted in each of the ocular sleeves 52 is a shade ring 60. A field lens 61 is positioned to be adjacent the shade ring 60 and held thereby in fixed position in the ocular sleeve 52. Adjacent the field lens 61 is a spacer ring 63 which abuts the field ring 61 on one side thereof and the eyepiece lens 64 on the opposite side thereof. An ocular tube 65 having an opening 66 therein for a user's eye to view through is likewise threadably mounted such that, when assembled, the opening 66, lens 64 and lens 61 are coaxially aligned and positioned so as to receive light from prism 41. When the binoculars 1 is fully assembled, the eyepiece lens 64 is rigidly located at a fixed distance from the objective lens 35 such that light must travel along a path of predetermined and fixed length between the lenses 35 and 64. The path traveled by the light between the objective lens 35 and the respective eyepiece lens 64 includes the distance traveled between the mirrors of each of the prisms 40 and 41 and also between the prisms 40 and 41. Preferably, the eyepiece lens 64 is positioned relative to the objective lens such that each set of lenses is fixed to focus at infinity. Also preferably, the distance traveled by light between each objective lens 35 and associated eyepiece lens 64 is equal to the combined focal length of the lenses 35 and 64. A shroud 70 is positioned over the eyepiece end of each section 2 and 3 to provide a smooth transaction between the associated user end of the ocular sleeve and the body housing 5.

In use, the user adjusts the distance between the sections 2 and 3 to accommodate the spacing between the eyes of the user by rotation of the sections 2 and 3 upon the center axle 12. Once the spacing is adjusted for the user, the binoculars 1 is immediately usable, as the user does not have to adjust the focus. As long as the object being viewed by the observer is the minimum distance from the user for which the user's eyes are capable of adjusting focus, the focus will be clear for the user.

It is to be understood that while certain forms of the present invention have been illustrated and described herein, it is not to be limited to the specific forms or arrangement of parts described and shown.

What is desired to be secured and claimed by letters patent is as follows:

1. A binoculars for viewing by an observer comprising:
   (a) a first binocular section;
   (b) a second binocular section pivotally connected to said first binocular section so as to allow for adjustment of spacing between eyes of a user thereof;
   (c) a first set of lenses including a first objective lens and a first eyepiece lens mounted in said first section;
   (d) a second set of lenses including a second objective lens and a second eyepiece lens mounted in said second section;
   (e) said first objective lens and first eyepiece lens being fixedly mounted with respect to one another so as to provide a permanent and unadjustable fixed focus; and
   (f) said second objective lens and second eyepiece lens being positioned relative to one another so as to provide said permanent and unadjustable fixed focus; said fixed focus being set for a distance such as to require approximately a four diopter eye adjustment in the eye of a user in order for the user to focus through said lenses and to allow the user to make such an eye adjustment to clearly view an object at infinity as well as for a substantial distance from the fixed focus distance toward the user, whereby the focus of the binoculars is permanently fixed and a user thereof can view objects within range requiring up to four diopters of adjustment on either side of said fixed focus distance with substantial clarity.

2. The binoculars according to claim 1 wherein:
   (a) said first objective lens and said first eyepiece lens are fixedly positioned relative to one another such that the pathway traveled by light between said first objective and eyepiece lenses is equivalent to the sum of the focal lengths of said first objective and eyepiece lenses; and
   (b) said second objective lens and said second eyepiece lens are fixedly positioned relative to one another such that the pathway traveled by light between said second objective and eyepiece lenses is equivalent to the sum of the focal lengths of said second objective and eyepiece lenses.

3. The binoculars according to claim 2 including:
   (a) a first pair of prisms positioned between said first objective lens and said first eyepiece lens so as to transfer light from said first objective lens to said first eyepiece lens; and
   (b) a second pair of prisms positioned between said second objective lens and said second eyepiece lens so as to transfer light from said second objective lens to said second eyepiece lens.

4. The binoculars as called for in claim 1 wherein each binocular section includes:
   (a) a body housing having mountings to connect to an associated housing and a central aperture;
   (b) an objective barrel mounted on one end of said body housing having a central aperture joined to the body housing aperture; said barrel having an interior lip positioning means opposite said body housing;
   (c) a respective objective lens being non-adjustably mounted in spaced relation to said positioning means;
   (d) a retainer member operably holding a respective objective lens in fixed position within a respective barrel whereby a respective objective lens is held a fixed distance from a respective body housing;
   (e) an ocular sleeve mounted on an end of said body housing opposite said objective barrel and having a central aperture aligned with said body housing aperture;
   (f) a shade ring mounted in said ocular sleeve;

(g) a field lens mounted in said ocular sleeve;
(h) a spacer ring abuting said field ring on one side thereof and a respective eyepiece lens on an opposite side thereof; and
(i) an occular tube receiving said shade ring, said field lens, and a respective eyepiece lens in a fixed relationship to one another and being received in a fixed position in said ocular sleeve whereby said eyepiece lens is permanently in a fixed position relative to said body housing and such that a respective eyepiece lens and objective lens are in permanent fixed position relative to one another.

* * * * *